(12) United States Patent
Palmer et al.

(10) Patent No.: US 8,114,492 B2
(45) Date of Patent: Feb. 14, 2012

(54) LABELED CONTAINERS MADE FROM EXPANDABLE THERMOPLASTIC MATERIALS HAVING IMPROVED PHYSICAL PROPERTIES

(75) Inventors: Brittney Palmer, Mars, PA (US); Robert Heffern, McDonald, PA (US); Dennis H. Piispanen, Beaver, PA (US); Jiansheng Tang, Westfield, IN (US); Michael T. Williams, Beaver Falls, PA (US)

(73) Assignee: NOVA Chemicals Inc., Moon Township, PA (US)

( * ) Notice: Subject to any disclaimer, the term of this patent is extended or adjusted under 35 U.S.C. 154(b) by 621 days.

(21) Appl. No.: 12/271,095

(22) Filed: Nov. 14, 2008

(65) Prior Publication Data

US 2009/0162588 A1 Jun. 25, 2009

Related U.S. Application Data

(60) Provisional application No. 61/014,767, filed on Dec. 19, 2007.

(51) Int. Cl.
*B32B 23/00* (2006.01)
*B32B 1/08* (2006.01)

(52) U.S. Cl. ............... 428/35.7; 428/34.1; 428/34.2; 428/35.9; 428/36.9; 428/40.1

(58) Field of Classification Search ............... 428/34.1, 428/34.2, 35.7, 35.9, 36.9, 40.1
See application file for complete search history.

(56) References Cited

U.S. PATENT DOCUMENTS

| | | |
|---|---|---|
| 2,857,341 A | 10/1958 | Colwell et al. |
| 2,983,692 A | 5/1961 | D'Alelio |
| 3,023,175 A | 2/1962 | Rodman, Jr. |
| 3,461,088 A | 8/1969 | Stahnecker et al. |
| 3,647,723 A | 3/1972 | Mysik et al. |
| 3,663,466 A | 5/1972 | Jablonski |
| 3,736,273 A | 5/1973 | Hatano et al. |
| 3,959,189 A | 5/1976 | Kitamori |
| 4,036,675 A | 7/1977 | Amberg et al. |

(Continued)

FOREIGN PATENT DOCUMENTS

WO 01/85420 A1 11/2001
(Continued)

OTHER PUBLICATIONS

U.S. Appl. No. 11/506,818, filed Aug. 18, 2006, Wijnand Teensma, NOVA Chemicals Inc.

(Continued)

*Primary Examiner* — Marc Patterson
(74) *Attorney, Agent, or Firm* — Gary F. Matz (57) ABSTRACT

Labeled thin-wall containers molded from pre-expanded expandable thermoplastic particles having a label disposed over at least a portion of the outer surface of the container. The particles are coated with a composition that includes at least 2,500 ppm of a salt of a $C_8$ to $C_{32}$ carboxylic acid based on the weight of the particles. The label has a thickness of from 10 μm to 1,500 μm and the sidewall has a thickness of from 0.5 mm to 5 mm. An aqueous beverage at 80° C. does not leak from the container after being left undisturbed for 24 hours and the container has a rim strength of at least 0.54 kg. The containers are made by placing a label against an inner surface of a female portion of a two-part mold; closing the mold to form a mold cavity; filling the mold cavity with the particles; and fusing the particles.

12 Claims, 1 Drawing Sheet

U.S. PATENT DOCUMENTS

| | | | |
|---|---|---|---|
| 4,168,353 | A | 9/1979 | Kitamori |
| 4,191,803 | A | 3/1980 | Katoh |
| 4,303,756 | A | 12/1981 | Kajimura et al. |
| 4,303,757 | A | 12/1981 | Kajimura et al. |
| 4,698,367 | A | 10/1987 | Ikeda et al. |
| 4,703,065 | A | 10/1987 | Sonnenberg |
| 4,720,429 | A | 1/1988 | Sonnenberg |
| 4,798,749 | A | 1/1989 | Arch et al. |
| 4,840,759 | A | 6/1989 | Arch et al. |
| 5,244,861 | A | 9/1993 | Campbell et al. |
| 5,853,965 | A | 12/1998 | Haydock et al. |
| 5,866,282 | A | 2/1999 | Bourdelais et al. |
| 5,874,205 | A | 2/1999 | Bourdelais et al. |
| 5,888,643 | A | 3/1999 | Aylward et al. |
| 5,888,681 | A | 3/1999 | Gula et al. |
| 5,888,683 | A | 3/1999 | Gula et al. |
| 5,888,714 | A | 3/1999 | Bourdelais et al. |
| 5,908,590 | A * | 6/1999 | Yoshimi et al. ............... 264/45.4 |
| 6,066,594 | A | 5/2000 | Gunn et al. |
| 6,127,439 | A | 10/2000 | Berghmans et al. |
| 6,160,027 | A | 12/2000 | Crevecoeur et al. |
| 6,242,540 | B1 | 6/2001 | Crevecoeur et al. |
| 6,908,949 | B2 | 6/2005 | Arch et al. |
| 7,252,866 | B2 | 8/2007 | Tang et al. |
| 7,294,655 | B2 | 11/2007 | Tang et al. |
| 2003/0146533 | A1 | 8/2003 | Gornell |
| 2004/0121101 | A1 | 6/2004 | Tang et al. |
| 2004/0220303 | A1 | 11/2004 | Tang et al. |
| 2005/0153088 | A1 | 7/2005 | Russell et al. |
| 2006/0005917 | A1 | 1/2006 | Alvarez |
| 2006/0194013 | A1 | 8/2006 | Tang et al. |
| 2006/0252867 | A1 * | 11/2006 | Tang et al. ................... 524/386 |
| 2007/0017440 | A1 | 1/2007 | Tang et al. |
| 2007/0042144 | A1 | 2/2007 | Teensma et al. |

FOREIGN PATENT DOCUMENTS

| | | |
|---|---|---|
| WO | 2006/017872 A1 | 2/2006 |

OTHER PUBLICATIONS

U.S. Appl. No. 11/838,335, filed Aug. 14, 2007, Wijnand Teensma, NOVA Chemicals Inc.

U.S. Appl. No. 11/480,591, filed Jul. 3, 2006, Jiansheng Tang, NOVA Chemicals Inc.

U.S. Appl. No. 11/014,648, filed Dec. 16, 2004, Jiansheng Tang, NOVA Chemicals Inc.

U.S. Appl. No. 10/769,349, filed Jan. 31, 2004, Jiansheng Tang, NOVA Chemicals Inc.

U.S. Appl. No. 10/325,062, filed Dec. 20, 2002, Jiansheng Tang, NOVA Chemicals Inc.

U.S. Appl. No. 11/482,340, filed Jul. 7, 2006, Jiansheng Tang, NOVA Chemicals Inc.

U.S. Appl. No. 11/429,827, filed May 8, 2006, Jiansheng Tang, NOVA Chemicals Inc.

* cited by examiner

LABELED CONTAINERS MADE FROM EXPANDABLE THERMOPLASTIC MATERIALS HAVING IMPROVED PHYSICAL PROPERTIES

REFERENCE TO RELATED APPLICATION

The present nonprovisional patent application is entitled to and claims the right of priority under 35 U.S.C. §119(e) of U.S. Provisional Patent Application Ser. No. 61/014,767 filed Dec. 19, 2007, which is hereby incorporated herein in its entirety by reference.

BACKGROUND OF THE INVENTION

1. Field of the Invention

The present invention is directed to methods of manufacturing cups and containers made from expandable thermoplastic materials that provide improved physical properties, especially regarding the strength and non-leaking characteristics of the cups and containers.

2. Description of the Prior Art

Containers used for liquid or solid foodstuffs (e.g., drinking cups, containers for frozen confections and the like) are required to be substantially leak-proof so that the filled containers may be handled reliably during shipping and/or consumer usage with minimal risk of the contents leaking and thereby creating an inconvenient mess or bodily harm. In this regard, containers made from expandable thermoplastics particles (beads of expandable polystyrene or EPS, for example), sometimes referred to as foam cups, have a base molded to a generally cylindrical side wall and are susceptible to leakage when proper fusion of expandable particles is not achieved.

Often, the rim of a cup or container is adapted to accept a lid, which is snapped or press fit over the top of the rim of the container, securing the lid to the rim. When the strength of the container wall and rim is insufficient, the act of grasping the cup or container with a hand can cause the cup or container wall and rim to deflect and change shape causing the lid to be unintentionally removed from the cup or container. This situation provides an opportunity for the contents of the cup or container to be spilled thereby creating an inconvenient mess or bodily harm.

U.S. Pat. No. 4,191,803 discloses expandable particles of a styrene polymer containing 3 to 8% by weight of a blowing agent, having a particle size of 0.8 to 0.25 mm in diameter and pre-expanded particles that have a coating that includes an ester of sucrose on the surface of the pre-expanded particles. In the disclosure, it is explained that when EPS having a small particle size is used as a material for a thin walled food container, the thickness corresponds to 2 to 3 expanded particles. In this case, the possibility of leakage becomes an important problem. In contrast, leakage seldom becomes a problem in the case of an article formed with EPS particles having larger particle size used for containers having a thicker wall, where the thickness corresponds to 4 to 8 expanded EPS particles.

U.S. Pat. No. 2,857,341 discloses a method of preparing EPS particles for molding by forming the raw particles to include uniformly dispersed fatty acids in the particles and seeping the particles, with a particle size of less than 10 mesh in a blowing agent.

U.S. Pat. No. 3,461,088 discloses a method of producing EPS particles that includes pre-expanding EPS particles that contain a blowing agent and coating the pre-expanded particles with a water insoluble organic compound selected from paraffins, chloroparaffins, and fatty acids.

U.S. Pat. No. 3,647,723 discloses a process for preparing EPS particles that includes forming the raw polystyrene particles in the presence of a wax and a metal salt of a fatty acid and adding a blowing agent to the particles.

U.S. Pat. No. 3,663,466 discloses EPS particles that contain polystyrene, a blowing agent and a salt of a fatty acid uniformly dispersed in the particle.

U.S. Pat. No. 3,736,273 discloses a method of producing EPS particles that includes polymerizing styrene in the presence of a metal salt of an aliphatic carboxylic acid and adding a blowing agent to the particles.

U.S. Pat. No. 4,036,675 discloses a disposable cup or container and closure made from EPS, which is lined on one or both sides with unoriented polyolefin film. The film is secured to the foamed plastic base material using as a heat-sensitive adhesive a vinylic polymer or polyamide resin.

U.S. Pat. No. 4,698,367 discloses EPS particles that include polystyrene resin and a blowing agent in which a copolymer composed of a fluorinated vinyl polymer part and a hydrophilic vinyl polymer part covers or is included on the surface or in the surface layer of the EPS particles.

U.S. Pat. Nos. 4,703,065 and 4,720,429 disclose EPS cups molded from EPS particles coated on at least a portion of the surface of the particles with a fluorosurfactant.

U.S. Pat. No. 7,294,655 discloses EPS particles, used to form cups or containers. The EPS particles are coated with a composition that includes a liquid part that includes a liquid polyethylene glycol and a solid part that includes a polyolefin wax, a metal salt of higher fatty acids, and optionally a solid polyethylene glycol and/or a fatty bisamide or fatty amide.

U.S. Pat. Nos. 4,798,749 and 4,840,759 disclose cups molded from EPS particles that include isopentane as all or part of the blowing agent and coated with 300 ppm of silicone oil and 1000 ppm zinc stearate.

Thus, EPS that is conventionally used to mold low-density, thick-walled cups and containers is typically coated with approximately 1000 ppm of zinc stearate and approximately 250 ppm of silicone oil. Using higher levels of zinc stearate to make conventional low-density, thick-walled cups and containers results in poor fusion, which results in defective cups and the problem of lids being unintentionally removed from the cup or container as described above.

However, when high-density, thin-walled cups or containers are desired, the typical levels of lubricant used to make conventional low-density, thick-walled cups and containers results in poor leak resistance and the problem of lids being unintentionally removed from the cup or container as described above.

There is an unmet need in the art for methods to produce cups and containers that overcome the above-described problems.

SUMMARY OF THE INVENTION

The present invention is directed to a labeled thin-wall container molded from pre-expanded expandable thermoplastic particles into a shape having a sidewall with an outer surface and a base and having a label disposed over at least a portion of the outer surface of the sidewall of the container. The pre-expanded expandable thermoplastic particles are coated with a composition that includes at least 2,500 ppm of a salt of a $C_8$ to $C_{32}$ carboxylic acid based on the weight of the particles. The label has a thickness of from 10 μm to 1,500 μm and the sidewall has a thickness of from 0.5 mm to 5 mm. Notably, an aqueous beverage, at a temperature of at least 80° C. when placed in the container to a level of 75% of the total volume of the container does not leak from the container after being left undisturbed for 24 hours and the container has a rim strength of at least 0.54 kg.

The present invention also provides a method of making labeled thin-wall containers that includes:
  a) placing a label against an inner surface of a female portion of a two-part mold;
  b) closing the mold by securing a male portion of the two-part mold to the female portion to form a mold cavity;
  c) filling the mold cavity with pre-expanded expandable thermoplastic particles; and
  d) applying a sufficient amount of heat to cause the thermoplastic particles to further expand and/or fuse together to form a labeled thin-wall container.

An outer surface of the pre-expanded expandable thermoplastic particles is coated with a composition that includes at least 2,500 ppm of a salt of a $C_8$ to $C_{32}$ carboxylic acid. The label has a thickness of from 10 µm to 1,500 µm and a sidewall of the container has a thickness of from 0.5 mm to 5 mm. When an aqueous beverage, at a temperature of at least 80° C. when placed in the container to a level of 75% of the total volume of the container does not leak from the container after being left undisturbed for 24 hours and the container has a rim strength of at least 0.54 kg.

The present invention is also directed to labeled thin-wall containers made according to the above-described method.

DETAILED DESCRIPTION OF THE INVENTION

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In order to form a more complete understanding of the invention, the following description should be taken in connection with the accompanying drawing figures where like reference characters identify like parts throughout.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "(meth)acrylic" and "(meth) acrylate" are meant to include both acrylic and methacrylic acid derivatives, such as, the corresponding alkyl esters often referred to as acrylates and (meth)acrylates, which the term "(meth)acrylate" is meant to encompass.

As used herein, the term "polymer" is meant to encompass, without limitation, homopolymers, copolymers, graft copolymers, and blends and combinations thereof.

Unless otherwise specified, all molecular weight values are determined using gel permeation chromatography (GPC) using appropriate polystyrene standards. Unless otherwise indicated, the molecular weight values indicated herein are weight average molecular weights (Mw).

As used herein, the term "expandable thermoplastic particles" refers to a polymeric material in particulate or bead form that is impregnated with a blowing agent such that when the particulates and/or beads are placed in a mold or expansion device and heat is applied thereto, evaporation of the blowing agent effects the formation of a cellular structure and/or an expanding cellular structure in the particulates and/or beads. When expanded in a mold, the outer surfaces of the particulates and/or beads fuse together to form a continuous mass of polymeric material conforming to the shape of the mold.

As used herein, the term "pre-expanded" beads or particles refers to expandable thermoplastic particles that have been expanded, but not to their maximum expansion factor and whose outer surfaces have not fused. As used herein, the term "expansion factor" refers to the volume a given weight of resin bead occupies, typically expressed as cc/g. Pre-expanded thermoplastic particles can be further expanded in a mold where the outer surfaces of the pre-expanded resin beads fuse together to form a continuous mass of polymeric material conforming to the shape of the mold.

As used herein, the term "two-part mold" refers to a mold that separates into two parts, a female portion or core and a male portion. The two parts interlock to form a mold cavity in the space created between the male and female interlocked mold parts.

As used herein, the term "thin wall" refers to a container that has a sidewall thickness of from 0.5 mm to 5 mm.

As used herein, the term "aqueous beverage" refers to liquids that include water as a majority ingredient and are intended for human consumption and includes, without limitation coffee, tea, soda, beer, lemonade, and cider.

The present invention provides a labeled thin-wall container that includes pre-expanded expandable thermoplastic particles molded in a shape having a sidewall with an outer surface and a base with a label disposed over at least a portion of the outer surface.

Figure 1:
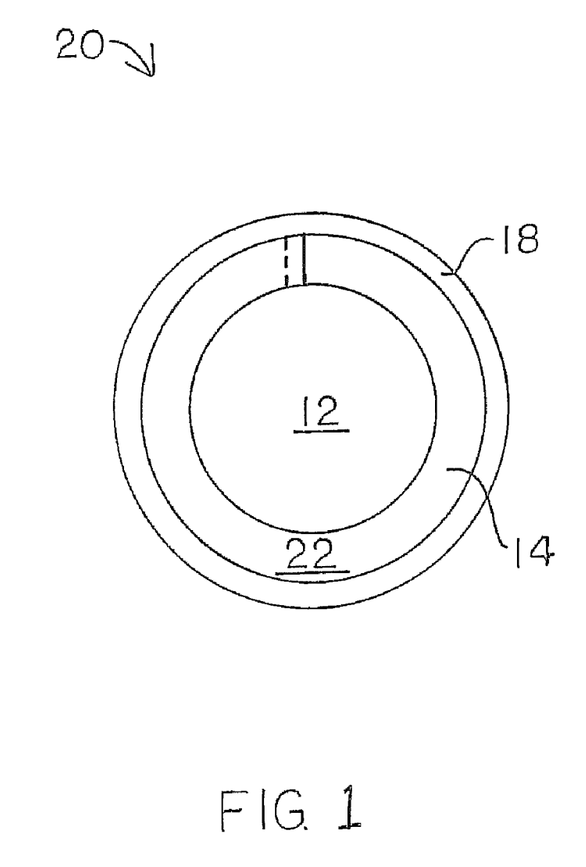
FIG. 1 is a bottom plan view of a labeled thin-wall container according to the invention.
Figure 2:
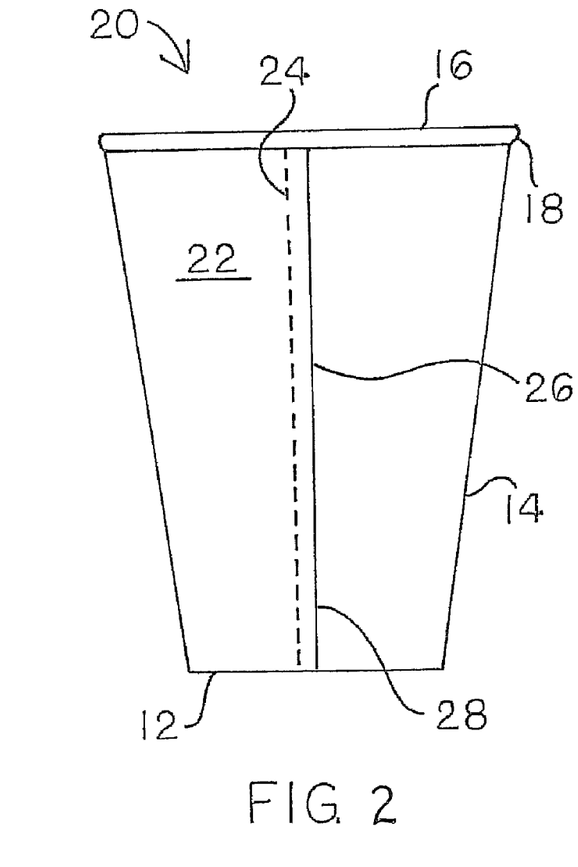
FIG. 2 is an elevation view of a labeled thin-wall container according to the invention.

FIGS. 1 and 2 show labeled container 20, which includes base 12, side wall 14, mouth 16, annular rim 18 as well as label 22. Label 22 includes first end 24 and second end 26, which can overlap to form a seam indicated by an edge 28 of second end 26 where they meet along side wall 14.

In embodiments of the invention, a heat sensitive adhesive can be applied to at least a portion of a bottom surface of label 22 to aid in attachment to container 20. In embodiments of the invention, a heat sensitive adhesive can be applied to the top surface of label 22 to aid attachment of second end 26 to first end 24.

Label 22 can be any suitable film disposed over at least a portion of an outer surface of sidewall 14 of container 20.

In the present invention, the pre-expanded expandable thermoplastic particles are coated with a composition that includes a salt of a $C_8$ to $C_{32}$ carboxylic acid.

Any suitable expandable thermoplastic particles can be used in the invention. Suitable expandable thermoplastic particles include those with dimensions that allow the expandable thermoplastic particles to be fed to a two-part mold without clogging or obstructing the feed channels in the mold and are able to expand and fuse together to form a molded container as described herein. Suitable expandable thermoplastic particles, include but are not limited to, those that contain homopolymers of vinyl aromatic monomers; copolymers of at least one vinyl aromatic monomer with one or more of divinylbenzene, conjugated dienes, alkyl (meth)acrylates, (meth)acrylonitrile, olefins, and/or maleic anhydride; polyolefins; polycarbonates; polyesters; polyamides; natural rubbers; synthetic rubbers; and combinations thereof.

Suitable vinyl aromatic monomers include, but are not limited to, styrene, isopropylstyrene, alpha-methylstyrene, nuclear methylstyrenes, chlorostyrene, tert-butylstyrene. In an embodiment of the invention, the vinyl aromatic monomers can be copolymerized with one or more other monomers, non-limiting examples being divinylbenzene, conjugated dienes (non-limiting examples being butadiene, isoprene, 1,3- and 2,4-hexadiene), alkyl methacrylates, alkyl acrylates, acrylonitrile, and maleic anhydride, where the vinyl aromatic monomer is present in at least 50% by weight of the copolymer. In many embodiments of the invention, styrenic polymers are used, particularly polystyrene, however, other suitable polymers can be used, such as, polyolefins (e.g., polyethylene, polypropylene), polycarbonates, polyphenylene oxides, and mixtures thereof.

In a particular embodiment of the invention, the expandable thermoplastic particles include expandable polystyrene (EPS) particles.

In the present invention, the thermoplastic particles are formed via polymerization in a suspension process, from which essentially spherical expandable particles are produced. These particles are useful as thermoplastic particles for making expanded thermoplastic foam containers. However, thermoplastic particles derived from solution and bulk polymerization techniques that are extruded and cut into particle sized resin bead sections of appropriate dimensions can also be used.

In an embodiment of the invention, expandable thermoplastic particles (in unexpanded form) containing any of the above-mentioned polymers have an average particle size of at least 10, in some situations, at least 25, in some cases, at least 50, in other cases, at least 75, in some instances, at least 100 and, in other instances, at least 150 μm. Also, the expandable thermoplastic particles can have an average particle size of up to 600, in some instances, up to 550, in other instances, up to 500, in some cases, up to 450, in other cases, up to 400, and, in some situations, up to 350 μm. The maximum average size of the expandable thermoplastic particles will be limited by the dimensions of the two-part mold to allow for feeding of the expandable thermoplastic particles into the mold as described herein. The expandable thermoplastic particles used in this embodiment can be any value or can range between any of the values recited above.

The number average particle size and size distribution of the expandable thermoplastic particles can be determined using low angle light scattering, which can provide a weight average value. As a non-limiting example, a Model LA-910 Laser Diffraction Particle Size Analyzer available from Horiba Ltd., Kyoto, Japan can be used In an embodiment of the invention, the polymers in the expandable thermoplastic particles have a weight average molecular weight (Mw) of at least 25,000, in some cases, at least 50,000, and, in other cases, at least 75,000 and the Mw can be up to 1,000,000, in some cases, up to 750,000 and, in other cases, up to 500,000. The weight average molecular weight of the polymers in the expandable thermoplastic particles can be any value or can range between any of the values recited above.

In an embodiment of the invention, after polymerization, the thermoplastic particles are isolated and dried and then suspended in an aqueous system. As used herein, "aqueous system" means a solution or mixture containing at least 50 wt. % water as the solution medium and/or continuous phase. Dispersing aids, nonionic surfactants and/or waxes can also be added to the aqueous system. When the thermoplastic particles are dispersed in the aqueous system, one or more blowing agents can be added.

The expandable thermoplastic particles can optionally be impregnated using any conventional method with a suitable blowing agent. As a non-limiting example, the impregnation can be achieved by adding the blowing agent to the aqueous suspension during the polymerization of the polymer, or, alternatively, by re-suspending the thermoplastic particles in an aqueous medium and then incorporating the blowing agent as taught in U.S. Pat. No. 2,983,692. Any gaseous material or material which will produce gases on heating can be used as the blowing agent. Conventional blowing agents include aliphatic hydrocarbons containing 4 to 6 carbon atoms in the molecule, such as, butanes, pentanes, hexanes, and the halogenated hydrocarbons, e.g., CFC's and HCFC's, which boil at a temperature below the softening point of the polymer chosen. Mixtures of these aliphatic hydrocarbon blowing agents can also be used.

Alternatively, water can be blended with these aliphatic hydrocarbons blowing agents or water can be used as the sole blowing agent as taught in U.S. Pat. Nos. 6,127,439; 6,160,027; and 6,242,540. In these patents, water-retaining agents are used. The weight percentage of water for use as the blowing agent can range from 1 to 20%. The texts of U.S. Pat. Nos. 6,127,439, 6,160,027 and 6,242,540 are incorporated herein by reference.

In an embodiment of the invention, the blowing agent can include one or more selected from nitrogen, sulfur hexafluoride ($SF_6$), argon, carbon dioxide, 1,1,1,2-tetrafluoroethane (HFC-134a), 1,1,2,2-tetrafluoroethane (HFC-134), 1,1,1,3,3-pentafluoro-propane, difluoromethane (HFC-32), 1,1-difluoroethane (HFC-152a), pentafluoroethane (HFC-125), fluoroethane (HFC-161) and 1,1,1-trifluoroethane (HFC-143a), methane, ethane, propane, n-butane, isobutane, n-pentane, isopentane, cyclopentane, neopentane, hexane, azodicarbonamide, azodiisobutyro-nitrile, benzene-sulfonylhydrazide, 4,4-oxybenzene sulfonyl-semicarbazide, p-toluene sulfonyl semi-carbazide, barium azodicarboxylate, N,N'-dimethyl-N,N'-dinitro-soterephthalamide, trihydrazino triazine, mixtures of citric acid and sodium bicarbonate, and combinations thereof.

In an embodiment of the invention, the blowing agent can be present in the expandable thermoplastic particles at a level of less than 14 wt. %, in some situations less than 6 wt. %, in some cases ranging from about 2 wt. % to about 5 wt. %, and in other cases ranging from about 2.5 wt. % to about 3.5 wt. % based on the weight of the expandable thermoplastic particles.

Any suitable dispersing aid can be used in the present invention. Suitable dispersing aids prevent the thermoplastic particles from sticking together when dispersed in the aqueous system. Examples of suitable dispersing aids include, but are not limited to finely divided water-insoluble inorganic substances, such as, tricalcium phosphate, zinc oxide, bentonite, talc, kaolin, magnesium carbonate, aluminum oxide and the like, as well as, water-soluble polymers, such as, polyvinyl alcohol, alkyl aryl sulfonates, hydroxyethyl cellulose, polyacrylic acid, methyl cellulose, polyvinyl pyrrolidone, and the like, sodium linear alkyl benzene sulfonates, such as, sodium dodecylbenzene-sulfonate, and combinations thereof. In an embodiment of the invention, the dispersing aid includes tricalcium phosphate together with a sodium linear alkylbenzene sulfonate. The amount of the dispersing aid necessary will vary depending on a number of factors but will generally be at least about 0.01, in some cases, at least about 0.05, and, in other cases, at least about 0.1 and can be up to about 2, in some cases, up to about 1, and, in other cases, up to about 0.75 parts by weight per 100 parts by weight of thermoplastic particles. The amount of the dispersing aid can be any value or can range between any of the values recited above.

One or more non-ionic surfactants can be included, such as, polyoxyalkylene derivatives of sorbitan fatty acid esters, such as, $C_8$ to $C_{32}$ linear or branched with up to five units of unsaturation, non-limiting examples being oleates, stearates, monolaurates and monostearates, an ethylene oxide/propylene oxide block copolymer, or other non-ionic or anionic surface active agent can be added to the aqueous suspension, if desired. In an embodiment of the invention, the amount of surfactant is at least 0.01, in some cases, at least 0.05, and, in other cases, at least 0.1 and can be up to 2, in some cases, up to 1, and, in other cases, up to 0.75 parts by weight per 100 parts by weight of thermoplastic particles. The amount of surfactant can be any value or can range between any of the values recited above. In an embodiment of the invention, the HLB of the above-mentioned polyoxyalkylene containing surfactants is at least 8, in some cases, at least 10 and, in other cases, at least 12 and can be up to 22, in some cases, up to 20 and, in other cases, at least 18. The HLB of the polyoxyalkylene containing surfactants can be any value or can range between any of the values recited above. The non-ionic surfactants can aid in the formation of fine cell structure in the expanded thermoplastic particles.

The waxes used in the present invention, at atmospheric pressure, are typically solid at 20° C. and below, in some cases, 25° C. and below, and, in other cases, 30° C. and below, and are liquid at 125° C. and above, in some cases, 150° C. and above, and, in other cases, 200° C. and above. The physical properties of the waxes used in the present invention are selected to aid in the formation of fine cell structure in the expanded thermoplastic particles.

In an embodiment of the invention, the waxes are selected from natural and/or synthetic waxes. As such, the waxes used in the present invention can be one or more materials selected from $C_{10}$ to $C_{32}$, in some instances, $C_{12}$ to $C_{32}$, in some cases, $C_{14}$ to $C_{32}$, and, in other cases, $C_{16}$ to $C_{32}$ linear, branched or cyclic alkyl, alkenyl, aryl, alkaryl, or aralkyl alcohols; $C_{10}$ to $C_{32}$, in some instances, $C_{12}$ to $C_{32}$, in some cases, $C_{14}$ to $C_{32}$, and, in other cases, $C_{16}$ to $C_{32}$ linear, branched or cyclic alkyl, alkenyl, aryl, alkaryl, or aralkyl carboxylic acids and/or their corresponding ammonium and metal salts or $C_1$ to $C_{32}$, in some instances, $C_{12}$ to $C_{32}$, in some cases, $C_{14}$ to $C_{32}$, and, in other cases, $C_{16}$ to $C_{32}$ linear, branched or cyclic alkyl, alkenyl, aryl, alkaryl, or aralkyl esters; $C_{10}$ to $C_{32}$, in some instances, $C_{12}$ to $C_{32}$, in some cases, $C_{14}$ to $C_{32}$, and, in other cases, $C_{16}$ to $C_{32}$ linear, branched or cyclic alkyl, alkenyl, aryl, alkaryl, or aralkyl hydrocarbons; polyethylene; polypropylene; polyester; polyether; and combinations thereof, so long as they meet a combination of liquid and solid temperatures as defined above.

The polyethylene, polypropylene, polyester, and polyether waxes can have a molecular weight (Mw) of from about 1,000 to about 100,000 so long as they meet a combination of liquid and solid temperatures as defined above In an embodiment of the invention, the amount of wax is at least 0.01, in some cases, at least 0.05, and, in other cases, at least 0.1 and can be up to 2, in some cases, up to 1, and, in other cases, up to 0.75 parts by weight per 100 parts by weight of expandable thermoplastic particles. The amount of wax can be any value or can range between any of the values recited above.

The thermoplastic particles used in the invention are advantageously solid particles in the form of thermoplastic resin particles produced from suspension polymerization as indicated above. The polymer is formed as a slurry of finely divided particles in the aqueous suspension. The particles are recovered by washing and drying.

In an embodiment of the invention, the resulting thermoplastic particles can be screened to remove any thermoplastic particles with particle sizes that are too large. In many cases, thermoplastic particles having a particle size greater than 600 μm, in some cases, greater than 500 μm and, in other cases, greater than 400 μm are removed by screening.

The impregnated expandable thermoplastic particles can include an interpolymer of a polyolefin and, in situ, polymerized vinyl aromatic monomers and, optionally, other expandable polymers.

In embodiments of the invention, the interpolymer of a polyolefin and in situ polymerized vinyl aromatic monomers is one or more of those described in U.S. Pat. Nos. 3,959,189; 4,168,353; 4,303,756, 4,303,757 and 6,908,949, the relevant portions of which are herein incorporated by reference. A non-limiting example of such interpolymers that can be used in the present invention include those available under the trade name ARCEL®, available from NOVA Chemicals Inc., Pittsburgh, Pa. and PIOCELAN®, available from Sekisui Plastics Co., Ltd., Tokyo, Japan.

In embodiments of the invention, the impregnated expandable thermoplastic particles are partially expanded or "pre-expanded" prior to being used in the molding equipment according to the invention. Thus, the expandable thermoplastic particles can be pre-expanded to a bulk density of at least 0.5 lb/ft$^3$ (0.008 g/cc), in some cases, at least 1.25 lb/ft$^3$ (0.02 g/cc), in other cases, at least 1.5 lb/ft$^3$ (0.024 g/cc), in some situations, at least 1.75 lb/ft$^3$ (0.028 g/cc), in some circumstances, at least 2 lb/ft$^3$ (0.032 g/cc) in other circumstances, at least 3 lb/ft$^3$ (0.048 g/cc) and, in particular circumstances, at least 3.25 lb/ft$^3$ (0.052 g/cc) or 3.5 lb/ft$^3$ (0.056 g/cc). When non-expanded expandable thermoplastic particles are used higher bulk density beads can be used. As such, the bulk density can be as high as 40 lb/ft³ (0.64 g/cc), typically up to 15 lb/ft³ (0.24 g/cc), in some cases, up to 14 lb/ft³ (0.224 g/cc), in other cases, up to 13 lb/ft³ (0.21 g/cc), in some situations, up to 12 lb/ft³ (0.19 g/cc), in some circumstances, up to 11 lb/ft³ (0.18 g/cc) and, in other circumstances, up to 10 lb/ft³ (0.16 g/cc). The bulk density of the pre-expanded expandable thermoplastic particles can be any value or range between any of the values recited above.

The bulk density of the expandable thermoplastic particles and/or prepuff particles is determined by weighing a known volume of polymer particles, beads and/or prepuff particles (aged 24 hours at ambient conditions).

The expansion step is conventionally carried out by heating the impregnated beads via any conventional heating medium, such as, steam, hot air, hot water, or radiant heat. One generally accepted method for accomplishing the pre-expansion of impregnated thermoplastic particles is taught in U.S. Pat. No. 3,023,175, the relevant portions of which are incorporated herein by reference.

In many embodiments of the invention, the pre-expanded expandable thermoplastic particles have an average particle size of at least 10, in some situations, at least 25, in some cases, at least 50, in other cases, at least 75, in some instances, at least 100 and, in other instances, at least 150 µm. Also, the pre-expanded expandable thermoplastic particles can have an average particle size of up to 600, in some instances, up to 550, in other instances, up to 500, in some cases, up to 450, in other cases, up to 400, and, in some situations, up to 350 µm. The maximum average size of the pre-expanded expandable thermoplastic particles will be limited by the dimensions of the two-part mold to allow for feeding of the expandable and/or pre-expanded thermoplastic particles into the mold as described herein. The pre-expanded expandable thermoplastic particles can be screened to remove particles that are too large. The pre-expanded expandable thermoplastic particles used in this embodiment can be any value or can range between any of the values recited above.

The coating composition described herein can be applied to the expandable thermoplastic particles either before or after the particles have been pre-expanded.

Thus, in some embodiments of the invention, a coating composition containing a salt of a $C_8$ to $C_{32}$ carboxylic acid is applied to the surface of the unexpanded expandable thermoplastic particles and the particles are subsequently pre-expanded to a desired density.

In other embodiments of the invention, the expandable thermoplastic particles are pre-expanded to a desired density and the pre-expanded particles are coated with a coating composition that includes a salt of a $C_8$ to $C_{32}$ carboxylic acid.

Any suitable $C_8$ to $C_{32}$ carboxylic acid can be used in the invention, so long as it provides the required container strength and anti-leaking properties desired in the present labeled thin-wall container. Suitable $C_8$ to $C_{32}$ carboxylic acids include, but are not limited to caprylic acid, capric acid, lauric acid, myristic acid, palmitic acid, stearic acid, arachidic acid, behenic acid, myristoleic acid, palmitoleic acid, oleic acid, linoleic acid, α-linoleic acid, arachidonic acid, eicosapentaenoic acid, erucic acid, docosahexaenoic acid, and combinations thereof.

Any suitable counter ion can be used to form the salt of a $C_8$ to $C_{32}$ carboxylic acid so long as the resulting salt provides the required container strength and anti-leaking properties desired in the present labeled thin-wall container. Suitable counter ions include, but are not limited to, ammonia, alkali metals including lithium, sodium and potassium, alkaline metals including beryllium, magnesium and calcium, and zinc, copper, silver, gold, nickel, iron, manganese, titanium, aluminum and combinations thereof.

The coating composition includes the salt of a $C_8$ to $C_{32}$ carboxylic acid, which acts as a lubricant, at a level of at least 2,500 ppm, in some cases, at least 2,600 ppm, in other cases, at least 2,700 ppm, in some instances, at least 2,800 ppm, in other instances, at least 2,900 ppm, and, in some situations, at least 3,000 ppm and can be up to 10,000 ppm based on the weight of the thermoplastic particles. The salt of a $C_8$ to $C_{32}$ carboxylic acid can be present in the coating composition at any of the values or can range between any of the values recited above.

In embodiments of the invention, the coating composition can optionally include liquid polyethylene glycols having an average molecular weight ranging from about 200 to about 800; waxes as described above, such as, polyolefin waxes, and, in particular, polyethylene waxes; solid polyethylene glycol having an average molecular weight ranging from 900 to about 10,000; fatty acid amides of the fatty acids indicated above; fatty acid bisamides of one or more of the fatty acids indicated above; paraffins; chloroparaffins; non-ionic surfactants as indicated above and combinations thereof.

The coating composition can be coated onto unexpanded or pre-expanded expandable thermoplastic particles using a ribbon blender or other mixing and/or blending techniques known in the art.

A desirable amount of coating composition and/or lubricant is a level that will fill voids between pre-expanded beads during fusion. In many cases, when the amount of lubricant is too high, the lubricant may obstruct steam flow and subsequently hinder fusion, as well as plug the fill tips in the two-part mold and build up in the various mold parts causing a maintenance issue.

As indicated above, a label is disposed over at least a portion of the outer surface of the sidewall of the container.

In an embodiment of the invention, the label substrate has a melting point of at least 120° C., in some cases, greater than 130° C., in other cases, greater than 135° C. and, in some instances, greater than 140° C. The melting point of the substrate is advantageously greater than the processing temperatures during molding.

The thickness of the label can vary based on factors, such as, the type of label material, the amount of structural support desired from the label sheet, and the quality of the graphics to be printed on the label sheet. As such, the label can be at least 10 µm, in some cases, at least 25 µm and, in other cases, at least 50 µm thick and can be up to 1,500 µm, in some cases, up to 1,250 µm, in other cases, up to 1,000 µm, in some instances, up to 750 µm and, in other instances, up to 500 µm thick. The thickness of the label can be any value or range between any of the values recited above.

Any suitable heat sensitive adhesive can be used on the label as described above. Suitable heat sensitive adhesives include, but are not limited to, ethylene-vinyl acetate copolymers, polyolefin resins, polyester resins, polyester-amide resins, polyamide resins, thermoplastic elastomers, acrylic resins, cellulosic resins, print lacquers and combinations thereof.

The labels used in the present invention are typically used to provide high quality graphics to the outside surface of the container. As such, the label sheets can include a coating and/or printing ink on a surface of the label. If the label is printed or coated on a surface in contact with the inner wall of the female portion of the two-part mold, the components of the coating or printing ink advantageously have a melting and/or softening point of at least 120° C., in some cases, greater than 130° C., in other cases, greater than 135° C. and, in some instances, greater than 140° C. When the melting and/or softening point of the components of the coating or printing ink are greater than the processing temperatures during molding, sticking of the labeled container to the inner wall of the female portion can be avoided.

When the label sheet is printed or coated on a side that is not in contact with the inner wall of the female portion, any suitable printing ink or coating can be used. Typically, in this case, the label substrate is clear and the printing or coating can be seen through the substrate. In an embodiment of the invention, when printing or coatings are placed on a side that is not in contact with the inner wall of the female portion, the printing or coating is a mirror image so that the desired image is viewed through the label sheet on the labeled container.

In an embodiment of the invention, the label substrate and any ink, adhesive or other coating on the label are suitable for direct and/or indirect food contact and comply with one or more of Section 201 of the U.S. Federal Food, Drug and Cosmetic Act, U.S. 21 Code of Federal Regulations (2005), EU Plastics Directive, 2002/72/EC, CoE Resolution on paper and board, Resolution AP (2002)1, or EC Superdirective on Food Contact Materials.

In an embodiment of the invention, the label substrate includes one or more materials selected from one or more thermoplastic resins, cellulose based paper, synthetic paper, metalized film, metal foils, and foam sheets.

Any suitable thermoplastic resin can be used. Suitable thermoplastic resins include, but are not limited to one or more selected from polyolefinic resins, ethylene-acrylic acid copolymers, ethylene-$C_1$-$C_{12}$ alkyl (meth)acrylate ester copolymers, metal salts of ethylene-methacrylic acid copolymers, poly(4-methyl-1-pentene), polyethylene terephthalate resins, polyvinyl chloride resins, polyamide resins, ABS resins, and combinations thereof.

Any suitable polyolefinic resin can be used. Suitable polyolefinic resins include, but are not limited to, propylene resins, high-density polyethylene, medium-density polyethylene, linear low-density polyethylene, ethylene-cyclic olefin copolymers, copolymers of propylene and one or more α-olefins, and combinations thereof.

Suitable synthetic papers that can be used in the invention include, without limitation, resin-coated paper, polyesters, microporous materials, such as, polyethylene polymer-containing material sold by PPG Industries, Inc., Pittsburgh, Pa. under the trade name of TESLIN®, a non-limiting example of which are those disclosed in U.S. Pat. No. 6,066,594, the relevant portions of which are incorporated herein by reference, TYVEK® synthetic paper available from E.I. DuPont de Nemours and Company, Wilmington, Del., OPPALYTE® films available from Mobil Oil Corp., New York, N.Y., other composite films listed in U.S. Pat. No. 5,244,861, the relevant portions of which are incorporated herein by reference, melt-extrusion-coated paper, and biaxially oriented support laminates, such as, those described in U.S. Pat. Nos. 5,853,965; 5,866,282; 5,874,205; 5,888,643; 5,888,681; 5,888,683; and 5,888,714, the relevant portions of which are incorporated herein by reference.

Suitable metalized films that can be used in the invention include films that contain at least two layers of material, such as, one layer of polymer and a layer of metal foil; at least one thermoplastic film layer and at least one metal foil layer; at least one cellulose based paper layer and a layer of metallic foil; or a textile material, including woven and non-woven fabrics made of natural or synthetic fiber, and at least one metal foil layer, any of which are joined together to form the metalized film.

Suitable metal foils that can be utilized in the present invention include, but are not limited to, foils of metals as copper, gold, silver, tin, chromium, zinc, nickel, platinum, palladium, iron, aluminum, steel, lead, brass, bronze, and alloys of the foregoing metals. On-limiting examples of such alloys include copper/zinc, copper/silver, copper/tin/zinc, copper/phosphorous, chromium/molybdenum, nickel/chromium, nickel/phosphorous, etc. The above metal foils can be utilized, as mentioned above, by themselves, or they can be joined or adhered to a polymer sheet or film to form a multi-layered laminate.

Suitable cellulose based paper materials include, but are not limited to, paper, clay coated paper, glassine, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any basis weight can be employed, paper having basis weights in the range of from about 20 to about 150 pounds per ream (lb/ream) are useful, and papers having weights in the range of from about 30 to about 60 lb/ream can be used.

In embodiments of the invention, the cellulose based paper materials include polymer-coated paper, which can be a sheet of paper that is coated on either one or both sides with a polymer coating. The polymer coating can contain a high, medium, or low density polyethylene, polypropylene, polyester, and other similar polymer films coated on the paper surface to add strength and/or dimensional stability. The weight of these types of coated paper materials can vary over a wide range with weights in the range of about 5 to about 50 lb/ream being useful. In total, the final coated paper can contain between about 10% and about 40% by weight polymer. For two-sided coatings, the quantity of polymer can be approximately evenly divided between the top and bottom surface of the paper.

In an embodiment of the invention, the substrate has a melting point of at least 120° C., in some cases, greater than 130° C., in other cases, greater than 135° C. and, in some instances, greater than 140° C. The melting point of the substrate is advantageously greater than the processing temperatures during molding.

The sidewall of the container has a thickness of at least 0.5, in some cases, at least 0.75 and, in other cases, at least 1 mm and can be up to 5, in some cases, up to 4 and, in other cases, up to 3 mm. The sidewall thickness often depends on the container height and is adjusted accordingly to provide sufficient strength to the container. The thickness of the sidewall of the container can be any value or range between any values recited above.

In some embodiments of the invention, the labeled thin-wall containers can be made using in-mold labeling methods that include:
 a) placing a label against an inner surface of a female portion of a two-part mold;
 b) closing the mold by securing a male portion of the two-part mold to the female portion to form a mold cavity;
 c) filling the mold cavity with pre-expanded expandable thermoplastic particles; and
 d) applying a sufficient amount of heat to cause the thermoplastic particles to further expand and/or fuse together to form a labeled thin-wall container.

Various devices for placing a label in a two-part mold, filling the mold with pre-expanded expandable thermoplastic particles and applying heat to form a labeled thin-wall container have been described in the art and can be used in the present invention.

A method and device that can be used to make the present labeled thin-wall containers is described in U.S. Patent Application Publication No. 2007/0042144. The method includes applying a label sheet, formed from a label material capable of maintaining an electrostatic charge, to an inner wall of female portions of two-part molds, positioning one or more male portions of the two-part molds in contact with the corresponding female portions to form one or more mold cavities, adding expandable resin beads or pre-expanded resin beads to the mold cavities, applying a sufficient amount of heat for a sufficient length of time to the mold cavities to effect expansion of the expandable resin beads or pre-expanded resin beads to form labeled containers, cooling the labeled containers, and removing the labeled containers from the mold cavities. The labels on the external wall of the labeled containers present a smooth circumferential surface.

The device disclosed in the above-referenced published application produces labeled expanded resin containers and includes at least one mold cavity rail; at least one mandrel rail oriented perpendicular to the mold cavity rail; a female mold cavity car adapted to move along at least one mold cavity rail between a removed position, a transfer position, and a molding position and including at least one female portion of a two-part mold oriented parallel to the mold cavity rail; a male mold cavity car adapted to move along at least one mold cavity rail between an extended position, a releasing position and a molding position and including at least one male portion of the two-part mold. The female portion and male portion form a mold cavity when the female and male mold cavity cars are in their respective molding positions. A mandrel car includes a mandrel that includes a first base having a dimension D1, a second base having a dimension D2, where D2 is greater than D1, a mandrel surface circumferentially and longitudinally disposed about the first base and the second base, a plurality of charging pins positioned along the mandrel surface from the first base to the second base, and a plurality of suction holes positioned along the mandrel surface, where at least the surface of the mandrel is made of a non-conducting material that is not deformable or hygroscopic at ambient conditions.

The device includes one or more magazines, adapted to hold a plurality of label sheets, adapted to move between a loading position and a feeding position; and one or more suction plates attached to an arm, the arms being adapted to move between a pick up position, where the suction plates are in close proximity to a top label in the magazines, and a feeding position, where the suction plates are in close proximity to the mandrel when the mandrel car is in the readying position. The mandrel is adapted to accept a label from the suction plates and arms and place the label onto the inner wall of the female portion of the two-part mold.

The mandrel car is adapted to move along at least one mandrel rail between a readying position and an insertion position and includes at least one mandrel adapted to seat within the female portion when the mandrel car is in the insertion position and the female car is in the transfer position. The mandrel car includes one or more cup removers adapted to pull a vacuum and be oriented directly opposed to a male portion when the mandrel car is in the insertion position and the male cavity car is in the releasing position.

Additionally, WO 01/85420 discloses a method and apparatus for molding an expanded plastics container having a label of flexible sheet material affixed to an external wall of the container during the molding cycle. This approach utilizes a device that includes a label pick-up station where a label to be affixed to the molded container is transferred by a plunger having a vacuum pick-up head from a stack of flat labels to a dummy male core and is wrapped about the dummy core. The latter is mounted on a carriage which is reciprocal between the label pick-up station and a molding station having a molding tool for molding expanded plastics material. When the dummy core enters the female mold part, the label carried by the core is transferred to and retained on the wall of the female mold part. Below the label pick-up station is an inspection station. When the carriage returns to the label pick-up station, the molded cup carried by the lower support of the carriage is released and drops on to an inspection core. If the container is acceptable, the inspection station delivers it to a stack on a conveyor.

U.S. Patent Application Publication No. 2003/0146533 discloses a two-part mold that can be used in the above-described device. This disclosure describes the molding of an expanded or foam plastics container with a rim flange projecting radially outward from the container side wall about the mouth of the container. This rim flange is similar to the roll type rim flange of a cup thermo-formed from plastics sheet material and is capable of capturing a snap-on lid. The mold tool for molding the container includes male and female mold parts, which are assembled to form a mold cavity defining the container. Heating/cooling cavities are provided in the mold parts adjacent to the mold cavity and the heating/cooling cavity in the male mold part is connectable via passageways controlled by a valve to the mould cavity adjacent the rim flange molding zone of the mold cavity. In order to mold the container, beads of a plastics material, including a foaming agent, are dispensed into the mold cavity, steam supplied via the conduit is injected into the mold cavity via passageways controlled by the valve member to cook the plastics material and mold the expanded plastics container, and during the cook cycle, the valve is controlling the passageways opened to redirect part of the steam flushing the heating/cooling cavity to the rim molding zone to provide an additional cook facility in this zone.

Another method and device that can be used to make the present labeled thin-wall containers is described in WO 2006/017872. The method and device produces EPS, EPP or EPE containers coated with a film or label. The method includes the steps of shaping the film or label into a shape corresponding to the outer or lateral contour of the container to be produced, inserting the shaped film into a shaping tool, and back-filling the film with the expandable material. The device for producing the containers includes a feed device for the film or label, and a shaping tool. In addition, a receptacle is provided that includes a film or label in a shape corresponding to the outer or lateral contour of the container, and includes an expandable material, which serves to back-fill the film or label.

The disclosures of U.S. Patent Application Publication Nos. 2003/0146533 and 2007/0042144 and International Application Publication Nos. WO 2006/017872 and WO 01/85420 are incorporated herein by reference in their entirety.

In other embodiments of the invention, the labels can be affixed to already molded containers using a "post-molding technique" that includes molding a container and subsequently wrapping/affixing a label to an exterior surface of the container, as a non-limiting example, using the methods described in U.S. Patent Application Publication 2006/0005917 A1.

As a non-limiting example, post-molding techniques can include first molding a foam container using conventional molding techniques; positioning the unlabeled foam container onto a mandrel at a first station; applying a label to an exterior surface of the foam container at a second station; directly heating a work piece that defines a cavity that corresponds substantially in shape to the outer surface of the foam container; positioning the work piece so that the cavity substantially surrounds the exterior surface of the foam container to which the label is applied at a third station; directly heating the exterior surface of the foam container to which the label is applied with said cavity as the foam container is disposed within the cavity, at a temperature and a time sufficient to bond the label to the exterior surface of the container to provide a labeled, foam container; and removing the labeled, foam container from the mandrel.

When molding conventional foam containers, applying a lubricant coating to the surface of pre-expanded particles can increase the strength of the container. However, the amount of lubricant that can be added is limited because of the resulting poor leak resistance that develops in containers having a high, i.e., greater than 2,000 ppm of lubricant based on the weight of the pre-expanded particles, lubricant level.

Further, a desirable amount of lubricant is a level that will fill voids between pre-expanded beads during fusion. In many cases, when the amount of lubricant is too high, the lubricant may obstruct steam flow and subsequently hinder fusion, increasing the risk of weak and brittle rims. Additionally, elevated lubricant levels can plug the fill assemblies in the two-part mold, as well as build up in the various mold parts causing a maintenance issue.

In the present invention, it has been found that in labeled thin-wall containers, substantially higher lubricant levels can be coated on the surface of the expandable thermoplastic particles, resulting in greater container strength and no drop off in leak resistance properties.

These properties provide a particular advantage over conventional foam containers because when a lid is pressed onto the rim of the present labeled thin-wall container, it is much less likely to deflect and change shape, causing the lid to be unintentionally removed from the container when the container is grasped. Further, the improved leak resistance coupled with the improved strength of the container will decrease any opportunity for the contents of the cup or container to be leaked or spilled and creating an inconvenient mess or bodily harm.

In particular, and, as described above, in the present invention, the outer surface of the unexpanded or pre-expanded expandable thermoplastic particles can be coated with a composition that contains at least 2,500 ppm of a salt of a $C_8$ to $C_{32}$ carboxylic acid. When these levels of lubricant are used in making labeled thin-wall containers having a label thickness of from 10 μm to 1,500 μm and a sidewall thickness of from 0.5 mm to 5 mm, the container has a rim strength of at least 0.54 kg and an aqueous beverage poured into the container at a temperature of at least 80° C. to a level of 75% of the total volume of the container does not leak from the container after being left undisturbed for 24 hours. As described above, this is a surprising result based on the results observed with conventional foam cups that may gain strength, but tend to leak at these levels of lubricant.

The present invention will further be described by reference to the following examples. The following examples are merely illustrative of the invention and are not intended to be limiting. Unless otherwise indicated, all percentages are by weight unless otherwise specified.

EXAMPLE 1

Polystyrene resin beads (DYLITE® Beads available from NOVA Chemicals Inc., Pittsburgh, Pa.) were used in this example.

To determine the effect of lubricant level on labeled thin-wall EPS cup molding operations, a study was conducted using various levels and types of lubricants.

The particle size distribution of the unexpanded DYLYTE beads used in the study is summarized in the tables below.

|  | 25 Mesh | 30 Mesh | 35 Mesh | 40 Mesh |
| --- | --- | --- | --- | --- |
| DYLITE BEAD | 0.0 | 0.23 | 4.32 | 34.37 |
|  | 45 Mesh | 50 Mesh | 60 Mesh | 80 Mesh | Pan |
| DYLITE BEAD | 43.33 | 9.72 | 7.26 | 0.78 | 0.0 |

Approximately twenty pounds of this material was blended with each of the following lubricants at the level specified based on the weight of the DYLITE beads.

1. 1000 ppm zinc stearate
2. 2000 ppm zinc stearate
3. 3000 ppm zinc stearate
4. 550 ppm calcium stearate The DYLITE beads were pre-expanded to a bulk density of 6.25 lb/ft³. 12 oz. labeled thin-wall EPS cups were made using a machine similar to that described in U.S. Patent Application Publication No. 2007/0042144 and available under the IMx™ technology brand name from NOVA Chemicals Inc. Rim strength tests and 24-hour leak tests were performed on six cups (one per cavity) from each of the four samples.

The 24-Hour Leak Test was conducted on one cup per cavity, for each of the four lubricant packages. The test was performed by filling the cups to 75% of the cup volume with coffee at a temperature of 85° C. The labeled thin-wall EPS cups were left undisturbed for 24 hours. Observations occurred every fifteen minutes for the first three hours and every thirty minutes for the next three hours. The final observation occurred at 24 hours. The results are described below.

1. 1,000 ppm zinc stearate—No failures were observed until the final observation at 24 hours. All six of the samples exhibited numerous coffee beads on the bottom of the cup.
2. 2,000 ppm zinc stearate—No failures were observed until the final observation at 24 hours. Cups #2, #3, #5, and #6 showed minor, visual coffee (not beads) around the bottom rim.
3. 3,000 ppm zinc stearate—No failures were observed until the final observation at 24 hours. Cups #1 and #6 showed minor, visual coffee (not beads) around the bottom rim.
4. 550 ppm calcium stearate—No failures were observed until the final observation at 24 hours. All six of the samples exhibited numerous coffee beads on the bottom of the cup.

Rim strength of five cups from each sample was measured using a Chatillon model DFGHS digital force gauge (AMETEK US Gauge Division, CHATILLON Brand Products, Largo, Fla.). The digital force gauge is set up such that the force gauge pushes against one side of a cup at a distance of one inch below the rim at a constant speed for a set distance of ¼ inch. The movement is controlled by a servo motor. When ¼ inch is reached the servo stops and the peak force value is recorded.

Rim Strength was determined on one cup per cavity, for each of the four lubricant packages. Measurements were taken at four locations around the cup rim, then averaged. The results, in kilograms, are shown in the table below.

| Machine Cavity | 1,000 ppm zinc stearate | 2,000 ppm zinc stearate | 3,000 ppm zinc stearate | 550 ppm zinc stearate |
|---|---|---|---|---|
| 1 | 0.482 | 0.447 | 0.557 | 0.487 |
| 2 | 0.484 | 0.471 | 0.581 | 0.491 |
| 3 | 0.474 | 0.468 | 0.561 | 0.489 |
| 4 | 0.491 | 0.486 | 0.572 | 0.493 |
| 5 | 0.478 | 0.469 | 0.550 | 0.492 |
| 6 | 0.473 | 0.467 | 0.540 | 0.479 |
| Avg | 0.480 | 0.468 | 0.560 | 0.488 |
| Std Dev | 0.007 | 0.012 | 0.015 | 0.005 |

The results demonstrate that the lubricant packages containing greater than 2,000 ppm performed well for both the 24-hour leak test and rim strength test.

The present invention has been described with reference to specific details of particular embodiments thereof. It is not intended that such details be regarded as limitations upon the scope of the invention except insofar as and to the extent that they are included in the accompanying claims.

What is claimed is:

1. A labeled thin-wall container comprising:
  a) pre-expanded expandable thermoplastic particles coated with a composition that comprises at least 2,500 ppm of a salt of a $C_8$ to $C_{32}$ carboxylic acid based on the weight of the particles molded in a shape having a sidewall with an outer surface and a base; and
  b) a label disposed over at least a portion of the outer surface of the sidewall of the container;
  wherein the label has a thickness of from 10 μm to 1,500 μm;
  wherein the sidewall has a thickness of from 0.5 mm to 5 mm;
  wherein an aqueous beverage, at a temperature of at least 80° C. when placed in the container to a level of 75% of the total volume of the container does not leak from the container after being left undisturbed for 24 hours; and
  wherein the container has a rim strength of at least 0.54 kg and the rim strength of the container is greater than a labeled thin-wall container made the same way except that the pre-expanded expandable thermoplastic particles are coated with a composition that comprises not more than 2,000 ppm of a salt of a $C_8$ to $C_{32}$ carboxylic acid based on the weight of the particles.

2. The container according to claim 1, wherein the expandable resin particles comprise one or more polymers selected from the group consisting of homopolymers of vinyl aromatic monomers; an interpolymer of a polyolefin and in situ polymerized vinyl aromatic monomers, copolymers of at least one vinyl aromatic monomer with one or more of divinylbenzene, conjugated dienes, alkyl (meth)acrylates, (meth)acrylonitrile, olefins, and/or maleic anhydride; polyolefins; polycarbonates; polyesters; polyamides; natural rubbers; synthetic rubbers; and combinations thereof.

3. The container according to claim 1, wherein the expandable resin particles have a number average particle size of from 10 to 600 microns.

4. The container according to claim 1, wherein the pre-expanded expandable thermoplastic particles have a density of from 0.5 to 15 lb./ft.$^3$.

5. The container according to claim 1, having a shape in plan selected from the group consisting of circular, oval, elliptical, square, rectangular, triangular, pentagonal, hexagonal, heptagonal, octagonal, trapezoidal, or parallelogram-like.

6. The container according to claim 1, wherein the label comprises a substrate containing one or more materials selected from the group consisting of one or more thermoplastic resins, cellulose based paper, synthetic paper, metalized thermoplastic film, metalized paper, metal foils, and foam sheets.

7. The container according to claim 6, wherein the thermoplastic resin is one or more selected from the group consisting of polyolefinic resins, ethylene-acrylic acid copolymers, ethylene-$C_1$-$C_{12}$ alkyl (meth)acrylate ester copolymers, metal salts of ethylene-methacrylic acid copolymers, poly(4-methyl-1-pentene), polyethylene terephthalate resins, polyvinyl chloride resins, polyamide resins, ABS resins, and combinations thereof.

8. The container according to claim 7, wherein the polyolefinic resins are selected from the group consisting of propylene resins, high-density polyethylene, medium-density polyethylene, linear low-density polyethylene, ethylene-cyclic olefin copolymers, copolymers of propylene and one or more α-olefins, and combinations thereof.

9. The container according to claim 6, wherein the substrate has a melting point of greater than 130° C.

10. The container according to claim 1, wherein the label includes a first end that overlaps a second end of the label to create a seam and the heat sensitive adhesive is only applied to at least a portion of an overlap of a bottom surface of the second end such that the heat sensitive adhesive contacts at least a portion of an overlap portion of a top surface of the first end.

11. The container according to claim 1, wherein the label comprises a heat sensitive adhesive disposed over at least a portion of a first surface and a coating and/or printing ink disposed over at least a portion of a surface of the label.

12. The container according to claim 11, wherein the heat sensitive adhesive comprises one or more selected from the group consisting of ethylene-vinyl acetate copolymers, polyolefin resins, polyester resins, polyester-amide resins, polyamide resins, thermoplastic elastomers, acrylic resins, cellulosic resins, print lacquers and combinations thereof.

* * * * *